Sept. 18, 1934.　　　G. LEVENE ET AL　　　1,973,906
DENSITY DETERMINATION BY X-RAYS
Filed Nov. 18, 1930
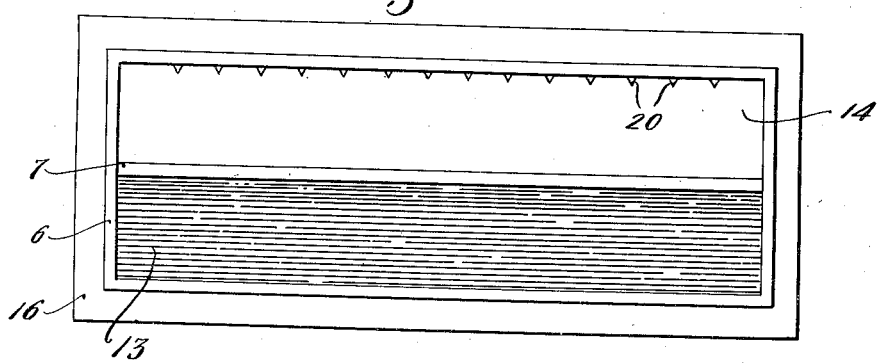
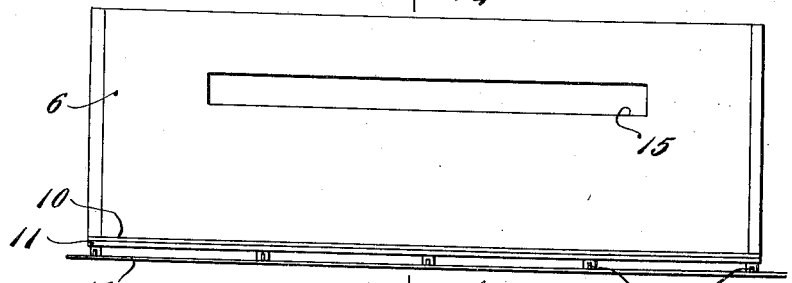
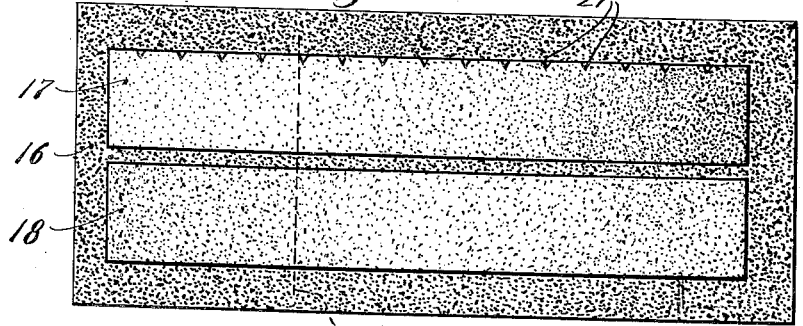
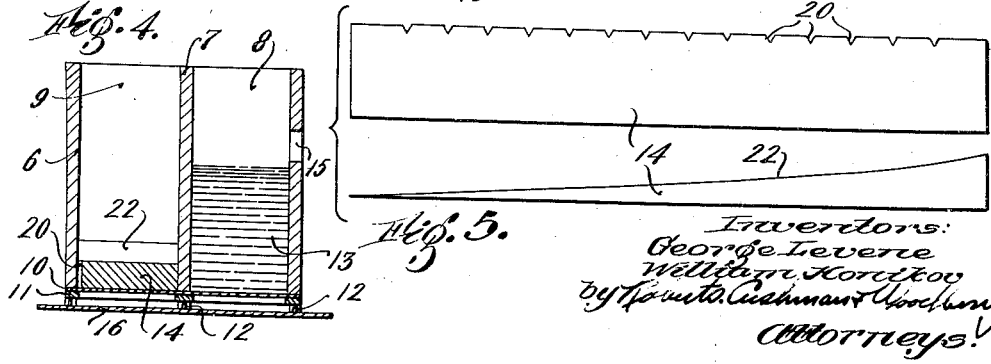

Patented Sept. 18, 1934

1,973,906

UNITED STATES PATENT OFFICE 1,973,906

DENSITY DETERMINATION BY X-RAYS

George Levene, Norwood, and William Konikov, Boston, Mass., assignors to Massachusetts Memorial Hospitals, Boston, Mass., a corporation of Massachusetts Application November 18, 1930, Serial No. 496,392

8 Claims. (Cl. 250—34)

This invention relates to a method of and apparatus for determining the absorption coefficient or capacity of a body by means of X-ray photography.

The principal object of the invention is to provide a simple and accurate method of and apparatus for determining the absorption coefficient or capacity of a substance to Roentgen rays, whereby certain unknown characteristics or properties of the substance such, for example, as its molecular weight, density, quality and/or purity (i. e. freedom from extraneous matter) may be computed or determined.

Further objects reside in the improved features characterizing the process and apparatus for carrying out our invention, as hereinafter described and illustrated in a preferred form in the accompanying drawing, in which:

Fig. 1 is a plan view of a recommended type of apparatus for testing liquids by the improved process;

Fig. 2 is a side elevation of Fig. 1;

Fig. 3 is a view of the finished film or plate showing the comparative exposures;

Fig. 4 is a section on line 4—4 of Fig. 2; and

Fig. 5 is a composite view illustrating a preferred form of gauge member employed with the apparatus of Figs. 1, 2, and 3.

In its preferred form our improved method consists essentially in producing by X-ray photography comparative exposures of a body to be tested and of a gauge or standard having graduated predetermined absorption capacities corresponding to known or computable density values and/or molecular weights, and selecting according to its transparency or capacity that portion of the gauge exposure which corresponds to the exposure of said body. The exposure of the body to be tested will be of uniform transparency, and its degree of transparency will obviously depend upon its absorptive capacity to Roentgen rays; whereas the exposure of the gauge will manifest varying transparency or opacity, depending upon the varying thickness or absorptive capacity of the gauge member. As the absorptive capacity of a body varies according to its density, and particularly to its molecular weight, these characteristics may be accurately computed by the aforesaid comparison.

The method and apparatus herein described is particularly useful in the determination of the function of elimination by the human kidneys, such elimination being dependent upon the physiologic equilibrium of certain agencies of metabolism. Since elimination varies in health and in disease, it may be regarded as an accurate criterion of the state of health or degree of disease of the excretory mechanism of the kidneys. For example, a certain substance containing organically bound iodine, injected into or otherwise present in the blood stream is subsequently eliminated by the kidneys, and, in accordance with this invention, both the presence and amount of iodine so excreted may be determined or computed from the comparison of the intensities of the shadows simultaneously produced on a photographic film by the X-rays passing through the specimen under test and the gauge or scale which may be graduated to correspond to known concentrations of iodine.

In a similar manner the method and apparatus herein described is available for both a qualitative and quantitative determination of any substance capable of absorbing X-rays which may be present in a body which is relatively pervious to X-rays. In such cases it is merely necessary to use a gauge member having graduated absorption capacities indexed to predetermined values of the particular substance under test.

While many optional arrangements of suitable apparatus may be employed in practicing our method, we have shown in the drawings a recommended type of testing apparatus which is particularly suitable for a particular class of work and which exhibits many meritorious features. It will be understood, however, that the means employed in carrying out our method or in utilizing our improved apparatus may be modified to suit particular purposes without departing from our invention, as defined in the appended claims.

In the particular embodiment chosen for the purpose of illustration, the apparatus is especially adapted for testing the absorption capacity of liquids and, for this purpose, comprises a rectangular container 6 having a central longitudinal partition 7 dividing it into two similar compartments 8 and 9 (Fig. 4). The walls and the partition 7 of the container are preferably made of brass or other material which has a high coefficient of absorption to Roentgen rays; whereas the bottom 10 of the container is formed of a thin sheet of aluminum or similar material which is relatively pervious to the rays. The base 10 may be secured by means of a metal frame 11 which underlies the container walls and partition and which may be fastened thereto by screws 12 or other fastening means.

One of the compartments, for example compartment 8, receives the liquid 13 which is to be tested; and the other compartment holds a gauge member or standard 14 which preferably consists of a removable, wedge-shaped plate of varying thickness from end to end. The gauge plate may be of any material whose coefficient of absorption to X-rays is either known or determinable but is preferably made of aluminum as this metal has a very low coefficient of absorption to X-rays and emits no characteristic radiation during exposure. Owing to its graduated thickness, the absorptive capacity of the plate 14 varies in value from end to end; whereas the density and absorptive capacity of the liquid is uniform and depends upon the depth and its coefficient of absorption. The depth of the liquid may be limited by providing a slot or drain opening 15 at the side of the container, so that, by filling the compartment or reservoir 8 until the liquid overflows at the slot 15, the depth factor is a known constant in determining the absorptive capacity of any liquid tested in the apparatus.

For the purpose of ascertaining the absorption capacity of the liquid, the comparative absorptive values of the liquid and gauge plate are recorded in parallel relation by X-ray photography, the rays being directed downwardly upon the container, and a film or plate 16 being located beneath the container. The resultant exposures or images are indicated in Fig. 3, in which the exposure of the wedge or gauge member appears at 17 and the exposure of the liquid at 18. The exposure or shadow 17 is of varying opacity, gradually increasing in transparency from the thicker end toward the thinner end of the wedge-shaped plate; whereas the exposure 18 is of uniform density or transparency. Hence, the corresponding values of the liquid and the gauge member may be ascertained by visual comparison of the transparency of the exposures, as indicated at the broken line 19 of Fig. 3, or by more delicate means of measuring the opacity of the comparative shadows. For visual determination, the partition 7 of the container should be quite narrow to permit close comparison of the exposures.

While it is feasible to determine the absorption capacity of the sample or specimen by measuring the thickness of the gauge at a point along the line 19 and thereafter calculating the absorption capacity corresponding to this point, the desired value is preferably determinable directly upon making the comparison of the exposures. For this purpose, the plate 14 may have scale marks, such as the notches 20 which appear at 21 in the exposure 17, denoting graduated index values corresponding to the predetermined absorption capacities of the gauge. In order that the linear intervals between uniformly graduated values may be equal, one or both surfaces of the gauge should be concaved, as shown at 22; for homogeneous X-rays are absorbed exponentially by a body through which they pass, and the absorption curve is therefore logarithmic in character and depends upon the thickness of the body. The curve 22 for a plate of any given material and thickness may be computed from known formulæ, and its absorption capacities together with the density values, molecular weights, and/or other properties or characteristics of the liquid corresponding thereto may be easily calibrated in the form of a linear scale by cutting the regularly spaced notches 20 or by other indications which may be located either on the plate 14 or on the film 16.

It is apparent that the material, thickness or taper of the wedge-shaped gauge, may be varied to provide a suitable range of values for the particular purpose intended; and it is also obvious that two gauges of different taper may be used successively, one for determining the approximate value of the specimen and the other for measuring the exact value within a limited range. The improved gauge may be employed in determining the absorption capacity of solid samples as well as liquid specimens, and in testing solids by our improved method the container 6 is obviously unnecessary. Furthermore, although we have illustrated a container having a pair of compartments of equal depth, it is evident that the compartment 9 merely constitutes a support for positioning the gauge member over the bottom 10 and adjacent the reservoir 8. The character or configuration of such support is accordingly not essential to our invention.

From the foregoing it is apparent that the absorption capacity of a homogeneous body may be easily and accurately determined by a simple and expeditious process; that a permanent photographic record of the absolute and comparative values of the subjects photographed may be preserved; and that the apparatus preferably employed in carrying out our method is readily constructed and convenient to use. As the comparative exposures are made simultaneously, the accuracy of the test is independent of the time of exposure, the power of the light source, or other conditions which may vary between successive exposures.

It should be understood that the present disclosure is for the purpose of illustration only and that this invention includes all modifications and equivalents which fall within the scope of the appended claims.

We claim:

1. Apparatus for determining the absorption characteristic of a body by means of X-ray photography, comprising a container having a bottom adapted to permit the passage of X-rays therethrough, a compartment for holding the body over said bottom, and a gauge member of low absorptive capacity supported over said bottom adjacent said compartment, the gauge member having varying thickness corresponding to graduated absorption capacities, whereby an X-ray photograph of the container displays comparative exposures of the body and of the gauge member.

2. Apparatus for determining the absorption characteristic of a body by exposure to X-rays, comprising a container having parallel compartments and a bottom member common to both compartments, said member having low absorptive capacity to X-rays and one of said compartments receiving the body to be tested, and a gauge plate removably inserted in the adjacent compartment, said plate having low absorptive capacity and being tapered longitudinally, whereby an X-ray photograph of the container and its contents displays comparative exposures of the body and of the gauge plate.

3. Apparatus for determining the absorption characteristic of a liquid by means of X-ray photography, comprising a container having parallel compartments and a bottom member common to both compartments, the bottom having low absorptive capacity for X-rays, one of said compartments constituting a reservoir for the liquid to be tested, and having a drain opening limiting the depth of the liquid, and a gauge plate received in the other compartment, said plate having low absorptive capacity to X-rays and being tapered longitudinally to provide graduated absorption capacities, whereby an X-ray photograph of the container and its contents displays comparative exposures of the liquid and of the gauge plate.

4. Apparatus for determining the absorption characteristic of a homogeneous body by exposure to X-rays, comprising a container having parallel compartments and a bottom member common to both compartments, said member having low absorptive capacity to X-rays and one of said compartments receiving the body to be tested, and a gauge plate removably inserted in the adjacent compartment, said plate having low absorptive capacity and being tapered longitudinally to provide graduated absorption capacities, whereby an X-ray image of the container and its contents displays comparative exposures of the body and of the gauge plate, and the plate having notches spaced along one edge to indicate predetermined variations in its absorptive capacity, so that the exposure of the plate shows its variable absorption capacities.

5. The method of determining the absorption characteristic of a body, which method comprises simultaneously passing X-rays through said body and a gauge member having graduated absorption capacities indexed to predetermined values, determining the location along the gauge where the intensity of the rays transmitted by the gauge corresponds to the intensity of the rays transmitted by the body, and noting the index value corresponding to said location.

6. The method of determining the absorption characteristic of a body, which comprises simultaneously producing by X-ray photography comparative exposures of said body and of a gauge member having graduated predetermined absorption capacities indexed to values corresponding to the absorption characteristic of the body under test, selecting that portion of the gauge exposure which corresponds in opacity to the exposure of said body, and noting the index value corresponding to said portion of the gauge exposure.

7. The method of determining the absorption characteristic of a liquid, which comprises simultaneously producing by X-ray photography comparative exposures of the liquid and a gauge member having graduated predetermined absorption capacities indexed to values corresponding to the absorption characteristics of said liquid, thereby to produce comparative exposures of which the exposure of the liquid under test has a substantially uniform opacity and that of the gauge member has a varying degree of opacity, selecting that portion of the gauge exposure which corresponds in opacity to the exposure of said liquid, and noting the index value corresponding to said portion of the gauge exposure.

8. The method of determining the absorption characteristic of a body, which comprises simultaneously exposing juxtaposed areas of a photographic film to two groups of rays from the same source, one group passing through the body to effect a relatively uniform exposure and the other group passing through a gauge member having graduated absorption capacities indexed to values corresponding to the absorption characteristic of said body thereby to effect a graduated exposure, selecting the zone of the graduated exposure which corresponds to the uniform exposure, and noting the index value corresponding to said zone of the graduated exposure.

GEORGE LEVENE.
WILLIAM KONIKOV.